United States Patent [19]
Lewis et al.

[11] 3,738,746
[45] June 12, 1973

[54] AUTOMATIC STEREOSCOPIC PROFILING SYSTEM

[75] Inventors: James G. Lewis, Falls Church; Thomas A. Hughes, McLean, both of Va.

[73] Assignee: The United States of America as represented by the Secretary of the Interior, Washington, D.C.

[22] Filed: Dec. 8, 1970

[21] Appl. No.: 96,035

[52] U.S. Cl. ........................................ 355/22, 33/1
[51] Int. Cl. ............................................. G03b 35/24
[58] Field of Search ........................... 353/5, 6, 7, 8; 350/136; 356/2; 33/210 D, 1 A; 355/22, 50

[56] References Cited
UNITED STATES PATENTS 3,066,572  12/1962  Littitz ..................... 355/50
3,486,820  12/1969  Blachut ................... 355/22

*Primary Examiner*—John M. Horan
*Attorney*—Ernest S. Cohen and Gersten Sadowsky

[57] ABSTRACT

Positive and negative transparencies of a stereo-pair of photographs of terrain are projected in a double-projection stereoplotter apparatus to produce an image containing a uniform density line having extended continuity and distinguishable from the overall showing which appears so as to provide a profile signature of a plane intersecting the terrain. Edge enhancement of the photographs aids in establishing a more definitive profile signature.

8 Claims, 4 Drawing Figures

INVENTORS
JAMES G. LEWIS
THOMAS A. HUGHES

AUTOMATIC STEREOSCOPIC PROFILING SYSTEM

The present invention is in a method and apparatus for producing a record of a surface profile of the type defined in a plane passing through a terrain surface. This recording appears as a topographic contour when taken in a horizontal plane, and has the form of a sectional outline which normally differs one from the other in planes angularly disposed with respect to the horizontal. A photographic record according to the invention is made by exposing film to a unique form of stereoscopic model produced when a pair of contrasting stereographic transparencies are projected as in a conventional stereoplotting operation. More particularly, such stereoscopic model is relatively displaceable parallel to the plane of the desired section at the same time a photographic plate moves at right angles to such plane wherein it is exposed gradually to record in a continuous fashion changing light manifestations at intersections between the sectional plane and the terrain surface. Detailed linear profiles of terrain, which are thus formed automatically in accordance with the invention, have special utility in the production of orthophotographs by apparatus such as the orthophotoscope disclosed in U.S. Pat. No. 2,869,419, granted Jan. 20, 1959, to Russell K. Bean.

It is known that profiles of terrain in the nature of that provided by the present invention can be produced by stereoscopically observing a three-dimensional photographic image of the terrain so as to facilitate the maintenance of a floating mark aperture on the surface of the image while the aperture is automatically translated across the image in a manner more fully disclosed in U.S. Pat. No. 2,960,771, granted Nov. 22, 1960, to R. H. Morris et al. Continuous critical stereoscopic observations must thus be made together with an exercise of mechanical control to change the vertical position of the moving aperture to cope with the relief variations present in the three-dimensional image. It is evident that the requisite observation and scanning procedures are relatively slow and tedious. Possible errors introduced by visual scanning and exposing a film simultaneously to produce records for use in connection with orthophotoscope control reflect on the quality of the orthophotograph produced thereby.

The continuous observation of a stereoscopic model heretofore required for recording a terrain profile is eliminated by utilization of the stereoscopic model applicable to the invention which is the product of intersecting light rays from photogrammetric plotter projectors employing therein positive and negative transparencies rather than the usual pair of generally corresponding diapositive transparencies from which is produced the conventional three dimensional stereoscopic model. As is well understood in the art, these plotter projectors are requisitely disposed to cause the light rays projected from them to intersect such that there is a plane at a predetermined distance from the focal points of the separate projectors on which their respective light rays having corresponding surface representing content intersect in a continuous pattern. Since positive and negative transparencies are used the aforesaid intersections of common surface representations are manifested by nearly equal quantities of light which appear in an unbroken line having a uniform intensity shading whereas the remainder of the particular showing is composed of shades variously intensified and characterized by line segments of varying discontinuities. Accordingly, such projections upon a horizontal screen make evident a distinguishable uniform intensity contour line representing the intersection of the plane of the screen with the surface of the three-dimensional model. If the screen is at some other angle to the intersecting light rays from the projector, a sloping plane profile appears. Photographic film suitably exposed to the aforesaid patterns of light provides a desired record of the contour or profile thus generated. Specifically, by separately exposing a continuous sequence of narrow bands of a photographic film, moving past a predetermined location, to the light of a positive-negative stereoscopic model being vertically displaced with respect to the aforesaid location, a film record is produced which shows a vertical section profile of the surface of the three dimensional model. This vertical displacement of the model effectively brings intersections of light rays in an infinite number of vertically disposed horizontal planes comprising the model part of interest into the plane of the photographic film during the concurrent movement of the film through a narrow elongated area open to light with the result that these narrow portions of the film are exposed to infinite pairs of intersecting corresponding light rays of the successive vertical levels. This procedure achieves a composite showing of the narrow portions in continguous relationship, wherein each such portion has represented thereon the image corresponding to a narrow width across a different one of the vertically disposed horizontal planes. Therefore, since the surface representing intersecting light rays produce at each level uniformly toned segments of the horizontal profile at that level, the composite showing is a complete profile revealed by these segments joined in an unbroken line of even tone.

An object of the present invention is therefore to provide a method and apparatus for the automatic production of records showing sections of terrain in outline.

Another object of the invention is to provide a method and apparatus for the automatic production of records showing terrain profiles.

A further object of the invention is to provide a method and apparatus for producing automatically records of terrain profiles in predetermined angularly disposed planes through the terrain.

These and other advantages, features, and objects of the invention will become more apparent from the following description taken in connection with the illustrative embodiments in the accompanying drawings, wherein.

Figure 1:
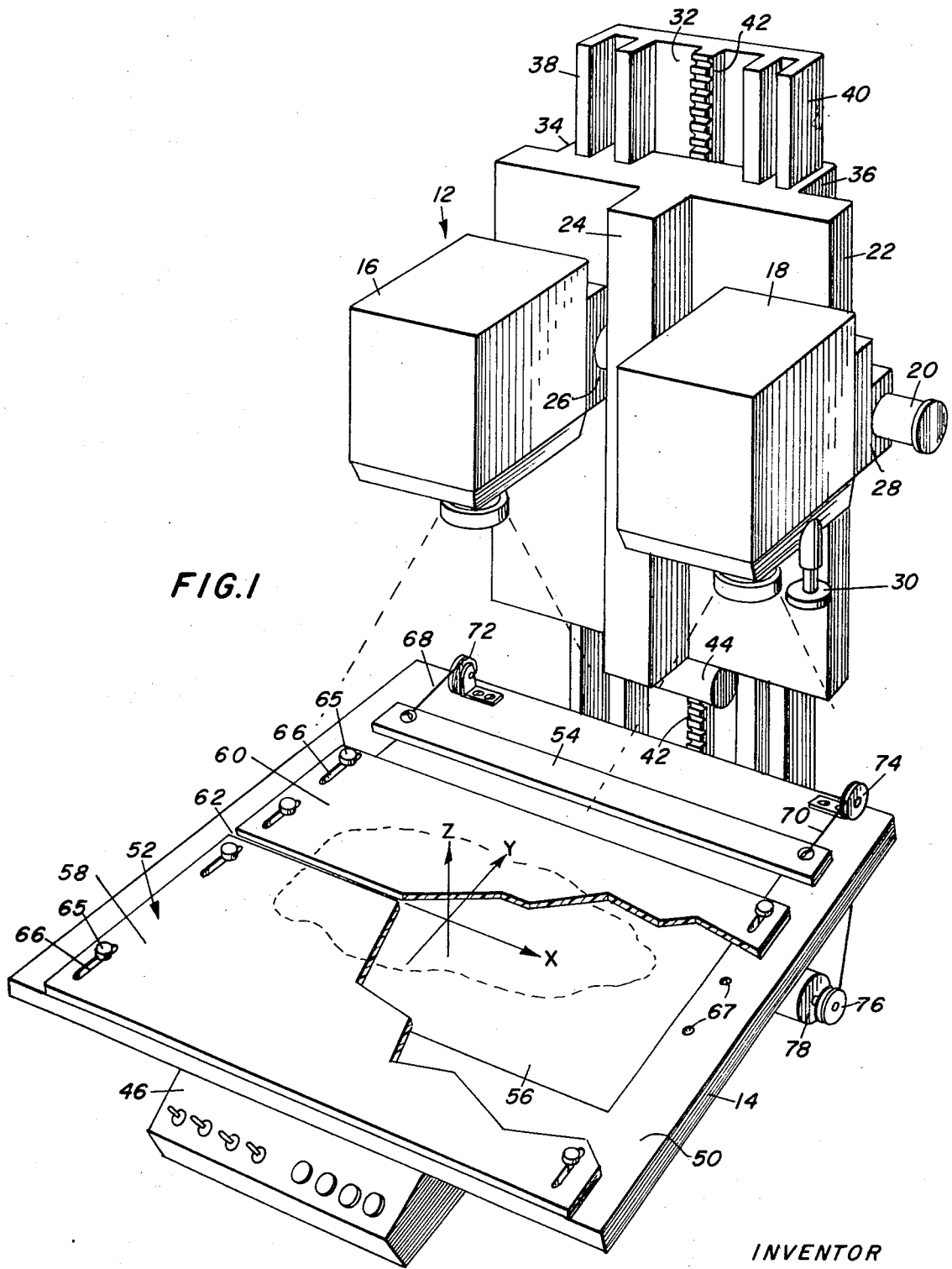
FIG. 1 is a pictorial representation, which is in part schematic, of the construction of apparatus comprising the present invention, and of the principles involved in the related method thereof.

Apparatus having utility in conducting the method of the present invention appears in FIG. 1 as part of a larger arrangement 10 which includes an anaglyphic or stereo-image alternating stereoplotting system 12 wherein a work table 14 is horizontally disposed beneath the lens apertures of the two projectors 16 and 18, respectively. Lateral adjustments of the projectors can be made on a horizontally disposed cylindrical beam 20 supported on a vertically disposed carriage 22 having centrally situated thereon, as an integral part thereof, a columnar projection 24 in which the beam is fixedly attached. Mounting brackets 26 and 28, affixed to rear panels of projectors 16 and 18, respectively, also have passages through which beam 20 is received, and wherein drive screws rotatable in the projector housings are arranged to engage racks attached to the beam. Adjustments modifying the lateral spacing between the projectors are enabled by connective manual controls such as knob 30 shown depending from the housing of projector 18. A relatively wide vertical member, constituting a standard 32 rising from connections to a base structure (not shown) of arrangement 10, is situated behind the far edge of table 14 where a substantial part of this standard extends above the table. Support carriage 22 is maintained for vertical displacements on standard 32 by engagement of spaced apart keyway configurations 34 and 36, projecting from the rear face of the support panel, with conforming channel-like tracks 38 and 40, respectively, extending along the vertical edges of the front face of the standard. Carriage 22 is thus adapted to be moved along tracks 38 and 40 in a controlled fashion by engagement of a motor driven pinion gear on the carriage with a rack 42 affixed to standard 32 midway between the tracks thereon. A motor 44 mounted to a bracket on the lower edge of carriage 22 drives the aforesaid pinion in accordance with directional and speed adjustments initiated by devices manipulatable on electrical control panel 46. A Zeiss DP-1 stereoplotter, and other similar equipment by which an entire model can be illuminated simultaneously and wherein two projectors have common vertical or Z-axis motion such as disclosed in the previously identified patent to R. K. Bean, are easily adapted for use in connection with the present invention.

Table 14 provides at the top thereof a smooth surface 50 on which are arranged in a working relationship a covering assembly 52, and a bar-like fastener 54 clamped to the leading, or rearwardly extended edge of a sheet of photographic film 56, laid out under the assembly. A broad plate 58, and a relatively smaller plate 60 are brought together in assembly 52 to form a flat opaque overlay which rests on a greater part of surface 50, and serves to mask ambient light from film sheet 56. These plates, which are of equal width, are aligned set apart a very short distance to define a straight, narrow slot 62 extending laterally between them. Slot widths ranging from 0.005 inch to 0.06 inch are exemplary for the embodiment of the invention disclosed herein. A set of thumbscrews 65, provided to maintain the plates in place on surface 50, fit through indexed slots 66 formed along the edges of these plates, and enter threaded holes 67 in the table top. As will be hereinafter more fully understood, slots 66 facilitate the positioning of assembly 52 on the table top so as to enable slot 62 to be requisitely placed with respect to projectors 16 and 18. Bar 54 is arranged to be moved rearwardly as seen in FIG. 1, away from plate 60, by pull cords 68 and 70 attached to the bar and drawn over pulleys 72 and 74, respectively, to reach under table 14 and connections on wind-up devices exemplified by spool 76. In operations, pull cords 68 and 70 are wound upon their respective spools by a motor driven spool shaft structure 78 for effecting displacement of bar 54 upon surface 50. Attached film sheet 56 is thus drawn by the bar, and linearly displaced under the plates of assembly 52. As will be hereinafter more fully explained in connection with the role of film sheet 56 in its cooperation with projector system 12, a steady sliding displacement of the film sheet continues the delivery of successive band-like portions of light sensitive surface thereof to the area under assembly slot 62 until a desired distance of vertical profile is covered thereby.

The disclosed embodiment of the present invention initially relies on the production of stereoscopic or terrain models from stereopairs comprising conventional glass-plate or film transparencies. These transparencies are mounted in plateholders, ordinarily provided therefor, which are placed in system 12 projectors 16 and 18. Light radiating through the plates or films is effective in a manner well known in the art to form images which produce on a flat white screen constituted by table surface 50 a three-dimensional terrain model viewable with the aid of appropriate stereoscopic sighting devices. Positioning projectors 16 and 18 by the previously identified manual and motor drives thereto therefore serves to displace the terrain model in directions confined to a vertical plane, such as defined by the directional axes indicators X and Z appearing in FIG. 1, in determining the location of the model with respect to the plane of surface 50, which appears in FIG. 1 as defined by directional axes indicators X and Y. In proceeding to obtain a record of the previously mentioned vertical profile of a terrain model, both projectors are first equipped with a stereopair of positive transparencies, and a projected image is produced generally centered in the plane of surface 50 by requisite adjustments of the projectors on beam 20. The sighting device used for viewing the terrain model is then appropriately adjusted for color orientation, and image synchronization where necessary. Thereafter, controls on panel 46 are operated to energize motor 44 which drives carriage 22 and the projectors thereon for displacement in the Z-axis direction to a point whereat that part of the terrain model of interest is caused to appear as being completely below the plane of surface 50. The removal of anaglyphic filters is then effected where they are used. Location of the line of intersection of the vertical epipolar plane, or plane of profiling in this instance, and surface 50, is thereafter determined by further driving carriage 22 to raise and lower projectors 16 and 18, and finding image points in the model that have no motion in the direction of the Y-axis when the projectors are moved in the Z-axis direction. This is done by first placing a reference mark under each projector at a short projection distance. Then, the projectors are raised vertically to a long projection distance, and discrete images in the immediate vicinity of each reference mark are observed for Y-direction movement with respect to the aforesaid reference marks. If movement is noted, the reference marks are moved in the appropriate direction to another fixed location. The procedure is repeated until no relative Y-motion occurs between the selected images and the reference marks. A line drawn on the table top passing through the final location of the reference marks is indicative of the intersection established by the crossing of the vertical epipolar plane through the horizontal plane. Thus, this epipolar plane is that which contains the two perspective centers of projection. Masking assembly 52 is thereafter placed on top of table 14, and its slot 62 is located by adjusting the width of the slot to a desired amount about the aforesaid line on the table such that the centerline of slot 62, and the line on the table coincide. Note is taken of the relative positions of threaded holes 67 in slots 66, and appropriate markings made on plates 58 and 60 adjacent each slot index to reference the location of these plates on table 14 as established by the previously described procedures.

In further proceeding with making the profile record, masking assembly 52 is removed from the table, and projector lamps and room lights are turned off. Under safelight conditions, sheet 56 of masking film is placed on table 14 emulsion side up and its leading edge attached to clamping bar 54. Assembly 52 is replaced on table 14, with attention being given to the reference markings at the slots thereon so as to correspond the position of the assembly with that which was heretofore established for it, at the same time bar 54 is situated on table 14 so as to permit the installation of film sheet 56 under the assembly. Thumbscrews 65, which are individually applied in the separate plate slots 66, are received by threaded holes 67 provided therefor in table 14 and tightened therein sufficiently to prevent displacements of plates 58 or 60 while avoiding restraints on film sheet 56 which prevent a smooth linear displacement thereof in the Y axis direction by a drive from bar 54. Further, the motor drive to spool shaft structure 78 is regulated to wind up the draw bar pull cords 68 and 70 at a time and rate which coordinate and correspond a linear rearward displacement of the film sheet in the Y axis direction with a linear upward displacement of projectors 16 and 18 away from table 14, in the direction of the Z-axis, effectuated by the controlled drive from motor 44.

Accordingly, the procedure continues with the stereopair positive now made operational in projector 16 when this projector is illuminated while projector 18 remains turned off. Drives from shaft structure 78 and motor 44 are simultaneously applied to obtain uniform rearward Y-axis displacement of film sheet 56 beneath the plates of assembly 52 and slot 62 therein, as carriage 22 moves illuminated projector 16, together with darkened projector 18, upward from the previously determined lowered position. It can therefore be recognized that successive narrow band-like areas of film sheet 56 thus progressively move to bring the photosensitive surfaces thereon under slot 62 where each such area is exposed to the particular bundle of light rays reaching the bottom of slot 62 at the time that area appears under the slot. Since light rays reaching these areas change their relative angular disposition, or slant with respect to fixed surface 50 by dispersing thereon as projector 16 follows the Z-axis upwardly, the images reaching slot 62 from the projector are constituted by different formations of the light rays in the XZ-plane. In effect, at every instance of the coordinated drives to film sheet 56 and projector 16, a distinctive form of the light ray bundle intercepts a separate area of the film and produces thereon the basis for an image which manifests a partial representation of a line at a particular elevation in the terrain model. The sum of the areas across film sheet 56 which is exposed during a predetermined horizontal excursion of the sheet accompanied by the requisite vertical displacement of projector 16, therefore provides a showing from which appears a partial stereoscopic representation of an elevational view of the vertical section in the terrain model which contains the vertical profile of interest.

Following the exposure of film sheet 56 to the light from projector 16, the projector lamp is turned off, the film is taken from under assembly 52 and out of clamp bar 54, and removed to a light tight box. A second sheet of making film is subsequently arranged for displacement under slot 62 in the manner previously described for film sheet 56. Carriage 22 is driven to again return the projectors to the lower position previously determined. Upon turning on the lamp of projector 18 to illuminate the other transparency of the stereopair, the appropriate motor drives are once more initiated to bring successive ones of band-like areas spanning the film sheet into the space under slot 62. Exposure of these areas to changing images transmitted thereto in a bundle of light rays generated in the XZ-plane by upwardly driven projector 18 provides the basis for a showing of a further partial stereoscopic representation of the previously mentioned vertical section of the terrain model containing the vertical profile of interest. The showing in this instance would complement the partial representation previously developed on film sheet 56. Positive transparencies produced from the negatives by processing the two film sheets are consequently suitable for use in a stereoplotter to derive a three-dimensional view containing the aforesaid vertical section. However, for the invention herein only one negative is processed for making a positive transparency which is combined with the other negative transparency by superimposition upon a light table. The vertical profile of interest is obtined by a careful registration of the two transparencies in an overlapping relationship which brings the profile into view as a distinguishable, continuous, uniform density line appearing against a background characterized by discontinuous bars and stripes of varying widths and densities. Proper X-direction registration of the two transparencies as indicated by the aforementioned procedures can be achieved by introducing a line across exposing slot 62 near the left and right sides of the model. Narrow pieces of opaque tape may be used for this purpose. By so doing, each of the resulting transparencies contains two unexposed portions in the form of lines whose direction is that of the film movement. For providing a Y-direction registration of the transparencies, left and right edges of the film are exposed to a momentary light flash through a small aperture when the film plane is at a preselected elevation in the stereoscopic model. By superimposing corresponding lines due to the lines across slot 62, and corresponding exposed areas, resulting in dots on the transparencies, complete registration is achieved.

Figure 2:
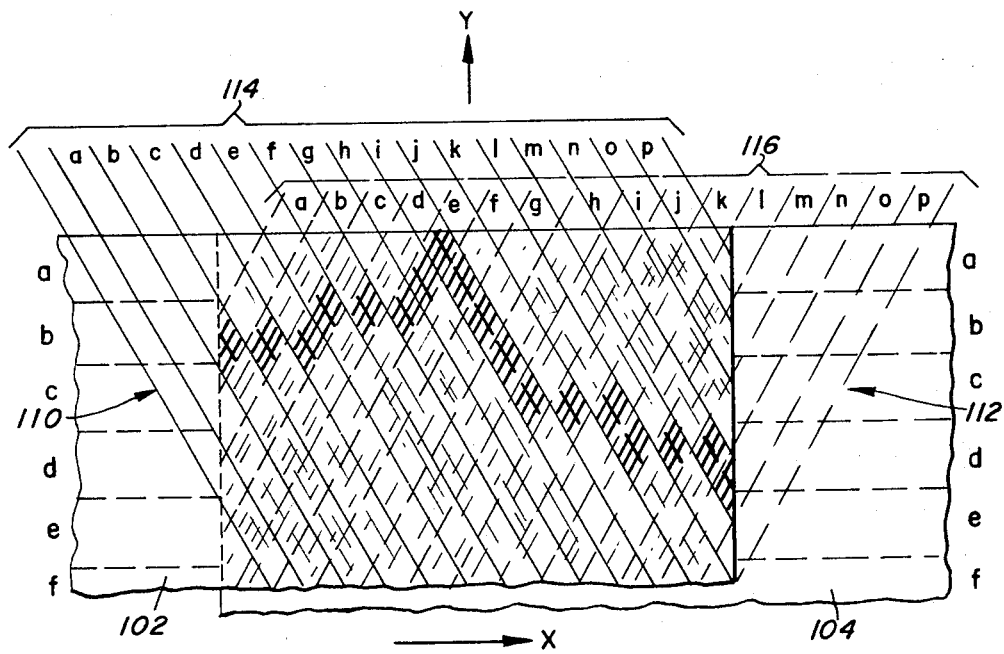
FIG. 2 is a schematic showing of the cooperative relationships involved in the procedural elements of the method according to the present invention.

Typical of the cooperative relationship giving rise to a linear profile in accordance with the present invention is an example thereof now explained with references to FIG. 2, wherein illustrative devices used include a positive transparency 102 and a negative transparency 104 which are represented in part as superimposed with their photographic features in registration. Contiguous spacial intervals 110 $a$ to $f$ and 112 $a$ to $f$, associated with transparencies 102 and 104, respectively, indicate the progressive development of the images on the related film sheets as evolved by the exposures thereof under slot 62 shown in FIG. 1. Lines descending obliquely to the right and left, across the transparencies, defining spaces 114 a to p and 116 a to p, respectively, are representative of the light rays from projectors 16 and 18, respectively. Because the critical movements by projectors 16 and 18 with their respective film sheets are made in synchronism, any one ray of bundle 114 traverses the individual intervals 110 at different locations along such intervals, and similarly rays of bundle 116 traverse intervals 112 at different locations. Thus, although, as hereinbefore indicated, corresponding intervals of the respective transparencies carry thereon images having essentially the same characteristics they differ to the extent that image elements on one transparency are, with a specific exception, all spacially differentiated from corresponding image elements as they appear on the other transparency. The exception noted occurs only where rays from the respective bundles 114 and 116, define in any particular interval corresponding points or sites in the terrain model which intersect on the exposed areas of the film sheets, or as appears in FIG. 1, along slot 62 in the plane of the Xy-axes. Since the corresponding intervals of the film sheets are progressively positioned for exposure under slot 62 during movement of these sheets in the Y-axis direction, as indicated in FIGS. 1 and 2, in synchronism with projector displacement in the Z-axis direction, the particular points in the various intervals where the rays' image elements intersect correspond to sites on the surface of the terrain model located in a plane defined by the directional axis of the projector travel and the slot wherein such sites are recorded. As seen in FIG. 1, this plane is defined by the XZ-axes, and will be recognized as the plane of the desired vertical profile. Accordingly, a track of these points of intersection in the derivative transparencies provides a record of the desired profile. This track is made to appear as a record of the profile by the previously disclosed superimposition and registration of positive and negative transparencies. As previously explained, the aforementioned intersecting image elements represent identical features, but since they arise from corresponding rays of "complementary" or opposite density, such as black versus white, dark gray versus light gray, and medium gray versus medium gray, the profile image is revealed by a line traceable along a showing of constant density distinguishable from images above and below it having varying or random densities by virtue of non-intersection of corresponding complementary density image elements of the rays. A schematic example of a profile trace appears in FIG. 2 as a train of uniform density images produced in superimposed intervals 110b and 112b, by intersecting rays 114 c, d, e, f and g and rays 116 b, c, c, d, and e, superimposed intervals 110a and 112a by intersecting rays 114 h, i, and i, and rays 116 e, e, and f, and correspondingly in the other superimposed intervals shown. However, in actuality, the profile trace appears as a smooth line of perceptible and varying width.

Figure 3:
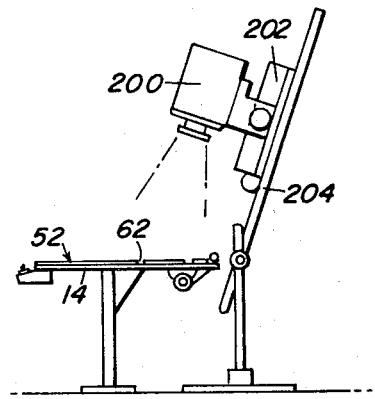
FIG. 3 illustrates a modification of the structural representation shown in FIG. 1.

In an alternate procedure according to the invention a stereo-scopic model is formed in the previously identified double projector plotter with edge-enhanced photographs, one being a positive transparency, and the other a negative transparency. Edge enhancement can be accomplished in a manner disclosed in U.S. Pat. No. 3,174,857, granted Mar. 23, 1965, to A. B. Clarke. In this case, all parts of the previously described procedure are followed including model orientation and scanning exposing. However, only one exposure of a film sheet is needed. A gray profile signature will be produced on the film exposed under the projectors since registration of the two projected images is performed in the previously mentioned relative orientation. Further, it will be evident from the disclosure herein, that where in the arrangement of FIG. 1, masking assembly 52 is not used, such that a single, suitably timed exposure of film sheet 56 is effectuated from a projection of a terrain model extending above surface 50, the processed film provides a gray line signature trace corresponding to a horizontal contour in the plane of the XY-axes. On the other hand, in an arrangement such as shown in FIG. 3, where projectors 200 are mounted on a carriage 202 enabling their linear displacement along the tracks of an angularly adjustable standard 204, profile traces in planes at various angles from the vertical can be accomplished by employing the scanning-exposing steps in either of the two alternate procedures previously disclosed.

Figure 4:
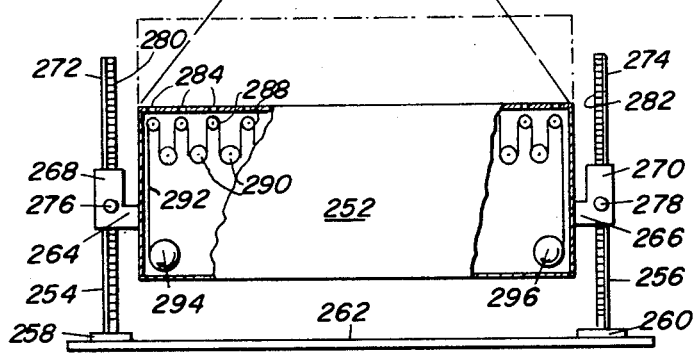
FIG. 4 illustrates a further modification of apparatus based on the principles of the present invention.

A scanning-exposing instrumentation such as illustrated in FIG. 4 achieves a simultaneous production of a multiplicity of vertical plane profiles using a single set of stereoplotter projectors 250. A generally rectangularly shaped casing 252 is shown supported on a pair of vertical standards 254 and 256, having base plates 258 and 260, respectively, affixed to an extended platform structure 262. Casing 252 is held suspended over platform 262 by a set of carrier brackets 264 and 266 having extension arms affixed to opposite side panels of the casing, and flanged channel parts 268 and 270, respectively, which key on to rail portions 272 and 274, respectively, of the supporting vertical standards. Motor drives 276 and 278, attached to the respective brackets, turn pinions (not shown) which engage racks 280 and 282 which constitute further parts of standards 254 and 256, respectively. A multiplicity of slots 284 spanning across the tops panel of casing 252 extend along the length of the casing evenly spaced apart one from the other. Casing 252 encloses within an upper section thereof an arrangement of horizontal disposed, elongated idler rollers including a set of rollers 288 situated in alignment directly under slots 284, and a further set of rollers 290 which are horizontally aligned at a predetermined lower level so as to lie beneath the spaces separating adjacent rollers in the upper level. Photographic film 292 fed from a reel 294 rotatably mounted in a lower section of casing 252 is threaded around the tops of upper rollers 288, and around the bottoms of lower rollers 290 so as to extend to a take-up reel 296 also rotatably mounted in the lower section of casing 252. A motor drive (not shown) rotating the reels, as indicated by the arrows shown thereon in FIG. 4, effectuates progressive movement of film 292 under slots 284. The displacement of the film, which usually does not exceed the distance between the upper and lower rollers, simultaneously enables the exposure of separate bands of film to the different rays of projectors 250 at the same time casing 252 is carried upward along rails 272 and 274 of the support standards. The total length of film moved past each slot thus corresponds to the exposed portion of film sheet 56 shown in FIG. 1. By setting platform 262 at a predetermined angle to the horizontal prior to exposing the film, a multiplicity of profiles in planes other than the vertical planes, will be secured.

Masking film of the type having utility in connection with the disclosed invention can be a continuous-tone, fine-grained, blue-sensitive film of moderately high speed and medium contrast, on a thin, dimensionally stable 0.004-inch Estar base, such as Kodak Blue Sensitive Masking Film having an ASA Tungsten exposure index rating of 25. Lithofilm, such as Kodalith, Ortho Film, Type 3, having an extremely high contrast, is an orthochromatic film which also gives a high-quality line and half-tone negative and positive suitable for the present invention.

While preferred forms of the method and apparatus of the invention has been described and illustrated, it is to be understood that the invention is not limited thereby but is susceptible to changes in form and details.

What is claimed is:

1. A method for producing a record of the linear form of a plane through the surface of a terrain, the steps comprising, making a stereopair of photographic transparency views of said terrain, including a positive transparency and a negative transparency, adjusting a stereoscopic projection arrangement utilizing said transparencies for orientation and elevational setting so as to present upon a screen thereof a three-dimensional image view of said terrain with said linear form distinguishable therein, darkening said projection arrangement, placing a photographic film sheet on said screen so as to cover therewith an area of the screen to be coincident with an area receiving said image, illuminating said projection arrangement for a time required to suitably expose said film to a projection of said image, and deriving by developing and printing said exposed film a showing whereon a continuous uniform density line is distinguishable to provide a record of said linear form.

2. Apparatus for producing a photographic record of a linear profile of a terrain, comprising in combination with a stereoscopic projection arrangement having therein a pair of positionally adjustable projectors and a plotting table disposed to receive thereon a three-dimensional image of said terrain as produced by the operation of said arrangement, a masking device for photographic film applied to said table whereon said image is received, said device including an assembly of covering elements maintained fixed with respect to said table whereon said elements are disposed to define an opening therebetween located over said film, means attached to said film operable to progressively displace a predetermined span of contiguous portions of said film beneath said opening in synchronism with a continuous linear readjustment of the position of said projectors with respect to said table.

3. The apparatus of claim 2 further comprising separate means respectively operable to adjust the angular and linear dispositions of said projectors with respect to said plotting table, and wherein said displacement of said film occurs in synchronism with a continuous positional readjustment of said projectors linearly after said projectors have been preset and fixed at a predetermined angular position with respect to said plotting table.

4. The apparatus of claim 2 wherein said assembly of covering elements further comprises in each said element a plurality of adjustable means for fixing the location of said element with respect to the plotting table after said elements are disposed to define said opening between said elements.

5. The apparatus of claim 2 wherein said film displacing means further comprises a linearly displaceable member clamped to an edge of said film, and a member drawing means including cords attached to said member and to a powered cord windup mechanism.

6. Apparatus for producing a photographic record of a linear profile of a terrain comprising a casing characterized by a plurality of uniformly spaced, regularly arranged, corresponding shaped slot openings within a top surface of said casing, a stereoscopic projector arrangement fixedly disposed over said slot openings operable to project a three-dimensional image of said terrain which spans across all said openings, a plurality of roller means uniformly disposed in alignment in a first level within said casing directly beneath said slot openings and in alignment therewith, a second plurality of roller means uniformly disposed in alignment in a second level within said casing at a predetermined distance from said first level beneath said spaces between said rollers of said first level and in alignment therewith, a feed reel and a take-up reel arranged in said casing separated from said rollers, and a photographic film extending between said reels by way of contact alternately around a top surface of individual rollers of said first level and around a bottom surface of individual rollers of said second level, a fixed base for said apparatus, means affixed to base and means affixed to said casing coacting to vertically displace said casing with respect to said base, and further means, operating in synchronism with said casing displacing means, for driving said reels whereby a different corresponding length of said film progressively passes beneath each said slot opening for exposure to a predetermined part of said projected image simultaneously with a vertical displacement of said casing with respect to said stereoscopic projector arrangement.

7. A method for producing a record of a linear profile in a plane through the surface of a terrain wherein said terrain is represented for view on a planar surface, disposed in a horizontal plane, as a three-dimensional stereoscopic model by projections of light rays on said planar surface emanating from first and second projectors predisposed in a stereoscopic projection arrangement and which produce images of said terrain surface previously recorded on separate transparencies of a stereopair in said arrangement, the steps comprising initially relatively orienting said projected images by predetermined adjustments of said first and second projectors in a first predetermined linear direction so as to form said stereoscopic model of said terrain to appear for said viewing below said horizontal plane, deriving a line through perspective centers of projection of said projectors in said profile plane which further lies in said horizontal plane, said line being formed in an intersection of corresponding light rays of said light rays manifesting image points at the same elevation in said stereoscopic model, by observation of at least two of said image points corresponding to preselected points on said planar surface, adapted to define said line, as further adjustments of said first and second projectors cause said two image points to alternately pass oppositely in said first predetermined linear direction through said horizontal plane until said two image points appear stationary with respect to a second predetermined linear direction coordinately disposed with respect to said first predetermined linear direction in said horizontal plane, darkening both said first and second projectors, masking a first photographic film displaceably disposed on said planar surface so as to leave unmasked under an opening in said masking a predetermined narrow portion of said first film centered along said derived line on said planar surface, illuminating said first projector, at said adjustment thereof where heretofore positioned to produce said stereoscopic model below said horizontal plane, to project a first image characteristic of one of said transparencies, synchronously moving linearly said projector and said masked first film in directions parallel to a reference plane, defined by said first and said second predetermined linear directions, and perpendicular to said derived line, to pass said first film along said planar surface and under said opening to expose a predetermined span of contiguous narrow portions of said first film to said image of said projected one of said transparencies, duplicating said synchronous movements linearly parallel to said reference plane and perpendicular to said derived line employing said second projector again illuminated, with said first projector darkened, and masking a second photographic film in place of said first film to expose a predetermined span of contiguous narrow portions of said second film to said projected other one of said transparencies, deriving by photographic processing said first and second exposed photographic films a positive transparency from one of said exposed first and second films, and a negative transparency from the other one of said exposed first and second films, and superimposing said derived positive and negative transparencies for viewing upon a lighted background so as to obtain a registration of common indicia on said transparencies whereby is secured a continuous density line distinguishable in said lighted viewing which provides a record of said linear profile.

8. A method for producing a record of a linear profile in a plane through the surface of a terrain wherein said terrain is represented for viewing on a planar surface, disposed in a horizontal plane, as a three-dimensional stereoscopic model by projections of light rays on said planar surface emanating from first and second projectors predisposed in a stereoscopic projection arrangement and which produce images of said terrain surface previously recorded on separate positive and negative edge-enhanced photographic transparencies of a stereopair in said arrangement, the steps comprising initially relatively orienting said projected images by predetermined adjustments of said first and second projectors in a first predetermined linear direction so as to form said stereoscopic model of said terrain to appear for said viewing below said horizontal plane, deriving a line through perspective centers of projection of said projectors in said profile plane which further lies in said horizontal plane, said line being formed in an intersection of corresponding light rays of said light rays manifesting image points at the same elevation in said stereoscopic model, by observation of at least two of said image points corresponding to preselected points on said planar surface, adapted to define said line, as further adjustments of said first and second projections cause said two image points to alternately pass oppositely in said first predetermined linear direction through said horizontal plane until said two image points appear stationary with respect to a second predetermined linear direction coordinately disposed with respect to said first predetermined linear direction in said horizontal plane, darkening both said first and second projectors, masking photographic film displaceably disposed on said planar surface so as to leave unmasked under an opening in said masking a predetermined narrow portion of said film centered along said derived line on said planar surface, illuminating both said first and second projectors, at said adjustment thereof where heretofore positioned to produce said stereoscopic model below said horizontal plane, to project images characteristic of said positive and negative transparencies, synchronously moving linearly said projectors and said masked film in directions parallel to a reference plane, defined by said first and said second predetermined linear directions, and perpendicular to said derived line, to pass said film along said planar surface and under said opening to expose a predetermined span of contiguous narrow portions of said film to said images of said projected transparencies rising through and above said horizontal plane, and deriving by photographic processing of said exposed film a positive transparency of said film whereon a continuous uniform density line is distinguishable to provide a record of said linear profile.

* * * * *